United States Patent [19]

Brunner

[11] Patent Number: 4,734,700

[45] Date of Patent: Mar. 29, 1988

[54] GROUP ANTENNA WITH ELECTRONICALLY PHASE-CONTROLLED BEAM

[75] Inventor: Anton Brunner, Starnberg, Fed. Rep. of Germany

[73] Assignee: Siemens Aktiengesellschaft, Berlin and Munich, Fed. Rep. of Germany

[21] Appl. No.: 881,605

[22] Filed: Jul. 3, 1986

[30] Foreign Application Priority Data

Jul. 5, 1985 [DE] Fed. Rep. of Germany ....... 3524148

[51] Int. Cl.[4] .......................... G01S 3/04; G01S 13/44

[52] U.S. Cl. .................................... 342/373; 342/368; 342/153

[58] Field of Search ................. 342/149, 153, 79, 368, 342/373, 427

[56] References Cited

U.S. PATENT DOCUMENTS

| | | | |
|---|---|---|---|
| 3,243,804 | 3/1966 | Smith, Jr. | 342/79 |
| 3,344,424 | 9/1967 | Hacker | 342/149 |
| 3,471,857 | 10/1969 | Schwartz | 342/427 X |
| 3,860,924 | 1/1975 | Crain | 342/427 |
| 3,946,395 | 3/1976 | Kirchhoff | 342/427 |
| 4,023,172 | 5/1977 | Schmidt | 342/149 X |

FOREIGN PATENT DOCUMENTS 2701228 9/1978 Fed. Rep. of Germany .

2822845 12/1983 Fed. Rep. of Germany .

OTHER PUBLICATIONS

German Article NTZ, 1968, Heft 10, Monopuls-Antenne fur Satellitenfunk, pp. 631-634.

French Antennes Pour Radars De Defense Aerienнce Revue Technique, Thomson-CSF-vol. 15, No. 2, Jun. 1983, pp. 481-482.

*Primary Examiner*—Theodore M. Blum

*Assistant Examiner*—Mark Hellner

*Attorney, Agent, or Firm*—Hill, Van Santen, Steadman & Simpson

[57] ABSTRACT

An omni-directional scanning group antenna with electronically phase-control beam for precise target locating or target tracking comprising a plurality of line fed individual radiators (1) distributed within the volume of an imaginary three-dimensional body (2) such as a sphere which is divided into eight separate sub-volumes V1 through V8 forming octants wherein the signals SV1 through SV8 of the octants ae combined with a circuit (4) comprising eleven sum-difference elements so as to form one sum signal, one elevation difference signal and two azimuth difference signals. The invention is suitable for application in three-dimensional phase-array antennas for all-around scanning with precise target locating and target tracking.

15 Claims, 13 Drawing Figures

GROUP ANTENNA WITH ELECTRONICALLY PHASE-CONTROLLED BEAM

BACKGROUND OF THE INVENTION

1. Field of the Invention

The invention relates in general to a group antenna comprising a plurality of line-fed individual radiators with omni-directional characteristics distributed within the volume of an imaginary body particularly a sphere which is symmetrical with respect to one horizontal plane and two intersecting vertical planes with the group antenna comprising electronically phasecontrolled beams for all-around radar scanning.

2. Description of the Prior Art

A group antenna is known from German patent No. 28 22 845.However, a precise target locating or, respectively, target tracking is not possible with this antenna.

In order to enable a precise target locating or target tracking with a group antenna, the mono-pulse method with a sum diagram and corresponding different diagrams is usually employed. For this purpose, a division of the individual radiators into subgroups and into a suitable combination is necessary.

Mono-pulse antennas which have previously been employed correspond to a planar rather than a three-dimensional element arrangement wherein the four subsurfaces or sub-antennas are combined in a sum-channel and an elevation difference channel and an azimuth different channel.

SUMMARY OF THE INVENTION

It is an object of the present invention to provide a three dimensional constructed group antenna without performing operations on the actual antenna configurations such that a precise target locating or target tracking with the mono-pulse method can be accomplished.

This object is achieved according to the invention in that the individual radiators are distributed into eight subvolumes, so-called octants which are respectively limited relative to one another by three mutually perpendicualr planes and are separately fed signals and for formation of an overall sum signal and an elevation difference signal and of two different azimuth different signals the signals of the eight octants are combined with a circuit comprising a total of eleven elements such as ring-hybrids, magic T's or the like, which respectively form sum-signals and difference signals with the sum and different signals of two octants which are adjacent each other being first respectively formed in the circuit and these sum and difference signals being further combined with the sum and difference signals of neighboring pairs of octants such that finally the four desired sum and difference signals of the eight octants occur at the outputs of the circuit.

The outputs of the elements forming the sum and difference signals which are not employed for further combination are provided with terminating impedances. In special evaluation methods, combination signals which can be referred to as diagonal signals which yield radiation minimums on the principal axes established by the intersection of the three planes and which are not required for the formation of the four desired sum and difference signals are also removed at sum outputs of the elements forming the sum and difference signals which are provided with a terminating impedance. Advantageously, the three dimensional distribution of the individual radiators which fill out the volume of the imaginary bodies is such that an optimal identical projected arrangement occurs in all directions.

Expediently, the individual radiators are designed for horizontal polarization and the feed lines to the individual radiators extend vertically. For example, the individual radiators can be formed by horizontally disposed conductor rings or by horizontally disposed crossed dipoles in the manner of turnstile antennas.

A card module structure is expedient for realizing the sum difference circuit and this can be executed in strip-line technique when small powers are transmitted, for example, assuming exclusive received mode or when using active individual radiators. For integration of the transmit mode with higher power in the sum channel, the sum-difference circuit can be realized in the form of a special coax system or waveguide system which can be constructed in this fashion or only in the sum channel path. Such a coax line system is known from German patent No. 27 01 228 and is identified by an outside conductor which is formed by a planar base plate composed of metal in which depressions having a constant quadratic or rectangular cross-section are provided which correspond to the respectively desired path lines and which is covered by a planar cover plate also composed of metal and mechanically and electrically connected to the base plate. Also, an inside conductor is placed in the depressions of the base plate and supported therein by dielectric supports. The inside conductor comprises a rectangular cross-section shape having a constant height and a width adapted according to the characteristic impedance required. An analogously employed waveguide system for the sum and difference circuit is also composed of a planar base plate composed of a metal member in which depressions having a constant quadratic or rectangular cross-section are provided corresponding to the respectively desired line paths and is also composed of a planar cover plate for covering the base plate with the cover plate being formed of metal and being mechanically and electrically connected to the base plate. The depressions in the base plate of the coax line system or waveguide line system can be milled by a computer controlled milling machine to provide an inexpensive structure.

The manufacturing of all the connecting lines of the sum-difference circuit in one plane, however, is not possible without through bridges. A small part of the circuit can also be executed in a second plane so as to bridge one or more of the line crossings.

Other objects, features and advantages of the invention will be readily apparent from the following description of preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
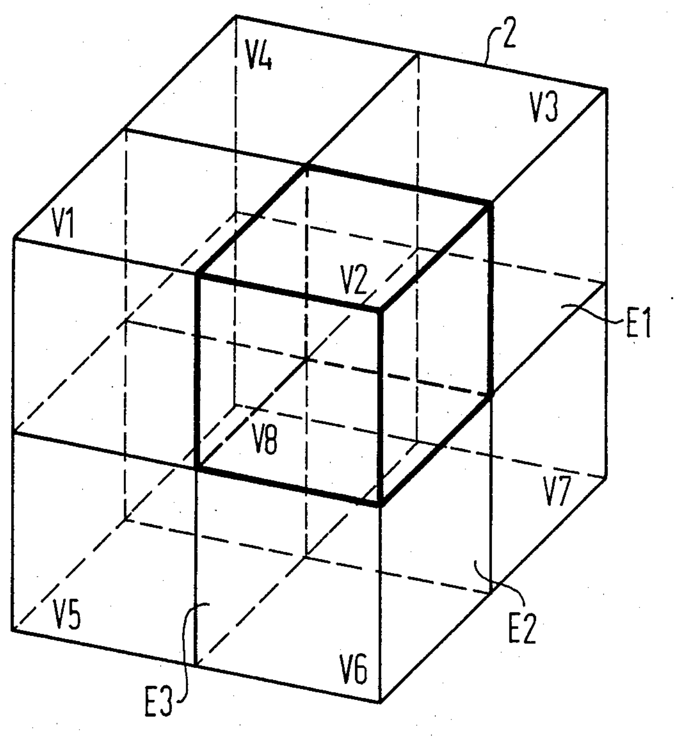
FIG. 1 is a perspective view of an imaginary cuboid antenna which has been divided into eight octants for the sum difference formation for a three-dimensional monopulse of a phase-controlled group antenna for all-around radar scanning according to the invention.

FIG. 1 illustrates a cube which is symmetrical relative to a horizontal plane El and two vertical planes E2 and E3 which intersect each other in a perpendicular manner. The cube forms an imaginary body 2 which has a volume in which individual radiators with omni-directional characteristics are to be distributed. The individual radiators within the cube are linefed and form a group antenna having electronically phasecontrolled beam sweep for all-around radar scanning. The three dimensional distribution of the individual radiators in the volume of the imaginary body 2 is such that an optimally identical projected arrangement occurs in all directions.

The individual radiators are divided into eight subvolumes V1 through V8 which are referred to as octants which are respectively limited from each other by the three planes E1, E2 and E3 and which are separately fed by signals. The signals occurring per octant V1 through V8 are referenced SV1 through SV8. The overall sum signal $\epsilon_g$, the elevation difference signal $\Delta_{E1}$, and the two difference azimuth difference signals $\Delta_{Az1}$ and $\Delta_{Az2}$ can be derived from the following equations:

$$\epsilon_g SV1+SV2+SV3+SV4+SV5+SV6+SV7+SV8$$

$$\Delta_{E1}=SV1+SV2+SV3+SV4-(SV5+SV6+SV7+SV8)$$

$$\Delta_{Az1}=SV1+SV2+SV5+SV6-(SV3+SV4+SV7+SV8)$$

$$\Delta_{Az2}=SV1+SV4+SV5+SV8-(SV2+SV3+SV6+SV7)$$

The combination of the signals SV1 through SV8 of the eight octants V1 through V8 occurs with a circuit having sum forming and difference forming elements such as ring hybrids, magic T's or the like.

Figure 2:
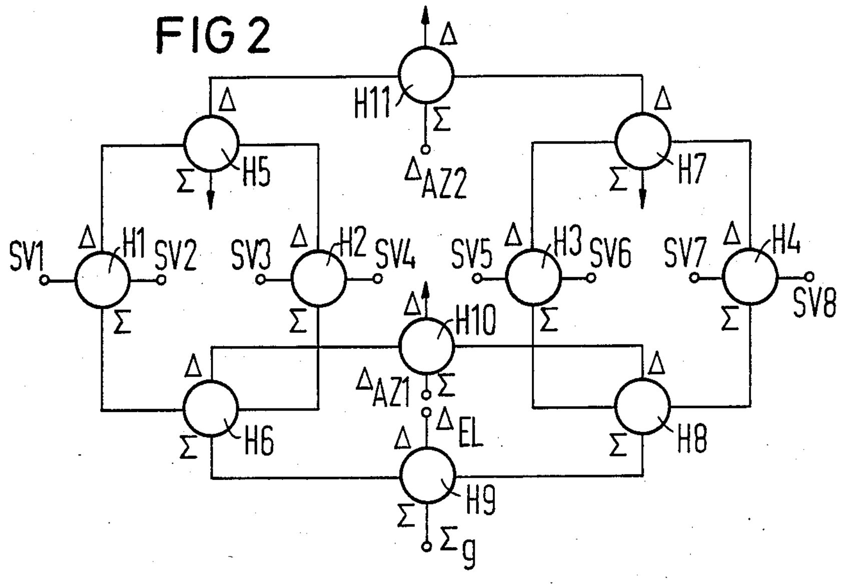
FIG. 2 is a block diagram of a sum-difference signal for a group antenna according to the invention.
Figure 3:
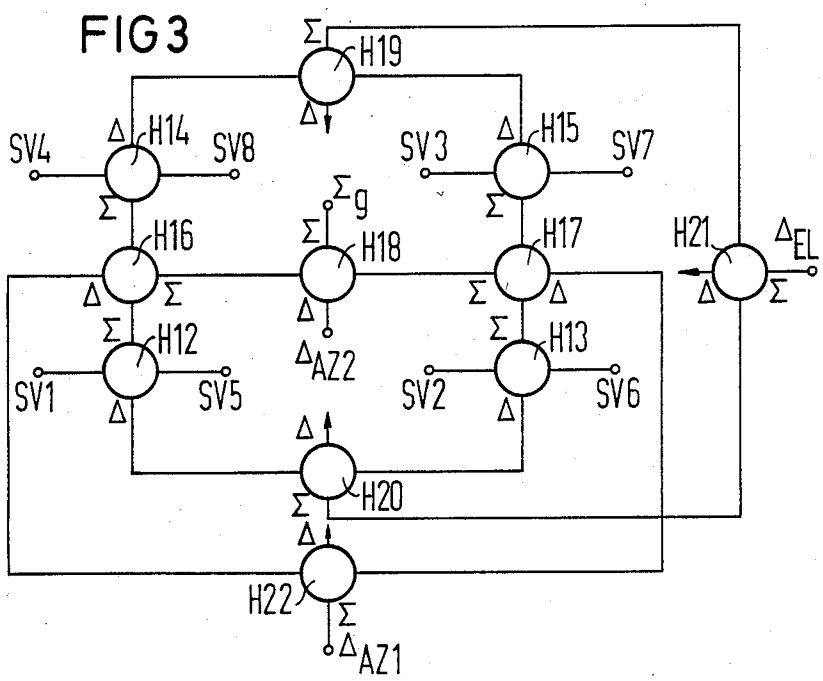
FIG. 3 is an electrical schematic block diagram of a modification of the sum-difference circuit for a three dimensional group antenna according to the invention.

Exemplary embodiments of such sum-difference circuits are illustrated in FIGS. 2 and 3.

In general, eleven sum and difference forming elements such as ring hybrids or the like are necessary for the formation of the four desired mono-pulse channels. In the embodiment illustrated in FIG. 2, sum and difference signals are formed at first from the octant signals SV1 and SV2 and SV3 and SV4, and SV5 and SV6, and SV7 and SV8. In other words, from the respective two octants which are adjacent each other with respect to the plane E3. The ring-hybrids H1, H2, H3 and H4 serve this purpose. The sum and difference signals of the ring-hybrids H1 and H2 are combined in the ring hybrids H5 and H6. Sum and difference signals occur at the outputs of the hybrids H5 and H6. The same thing occurs with the sum and difference signals of the hybrids H3 and H4 at the hybrids H7 and H8. The sum and difference signals of the hybrids H6 and H8 are further combined in two additional hybrids H9 and H10 so that the overall sum signals $\epsilon_g$ as well as the elevation difference signal $\Delta_{E1}$ occur at the sum and difference outputs of the hybrid H9 and one azimuth difference signal $\Delta_{Az1}$ occurs at the sum output of the hybrid H10. The difference output signals of the hybrids H5 and H7 are additionally combined in a hybrid H11 so that the second azimuth difference output of $\Delta_{Az2}$ occurs at the sum output of H11. The unused outputs are empty outputs of the hybrids H5, H7, H10 and H11 represent terminating impedances which are indicated by arrows.

FIG. 3 illustrates another exemplary embodiment of a sum difference circuit for a group antenna of the invention wherein sum and difference signals are first formed from two octants which are adjacent with respect to the plane E1. The sum and difference signals of the octant signals SV1 and SV5 are generated by the hybrid H12 and the sum and difference signals of the octant SV2 and SV6 are generated by the hybrid H13. The sum and different signals of the octant signals SV4 and SV5 are generated by the hybrid H14 and the sum and difference signals of the two octant signals SV3 and SV7 are generated by a hybrid H15. The sum and difference output signals of the hybrids H12 through H15 are combined using the ring hybrids H16, H17 and H18 so that the overall sum signal $\epsilon_g$ as well as the azimuth difference signal $\Delta_{AZ2}$ occurs at the sum and difference outputs of the hybrid H18. The elevation difference signal $\Delta_{E1}$ can be taken at the sum output of the hybrid H21 after a further combination through the hybrids H19, H20 and H21 as illustrated. The azimuth difference signal $\Delta_{Az1}$ occurs at the sum output of the hybrid H22 which follows a output of the differences of the hybrids H16 and H17.

The variations of the sum difference circuit for the three-dimensional individual radiator arrangement of the invention depend on the arrangement of the octant outputs. The two examples illustrated in FIGS. 2 and 3 represent a linear and a double quad combination. In general, eleven hybrids are necessary for the formation of the four desired mono-pulse channels.

Signal combinations which can be referred to as diagonal differences and which have radiation minimums lying on the principal axes which are generally not employed for the monopulse method occur at some outputs of the hybrids which form the sum and the difference signals. These outputs are therefore provided with terminating impedances which are illustrated by arrows in the exemplary embodiments of FIGS. 2 and 3. In other evaluation methods, the amplitude and phase information of the reception signals could be definitely utilized.

Figure 4:
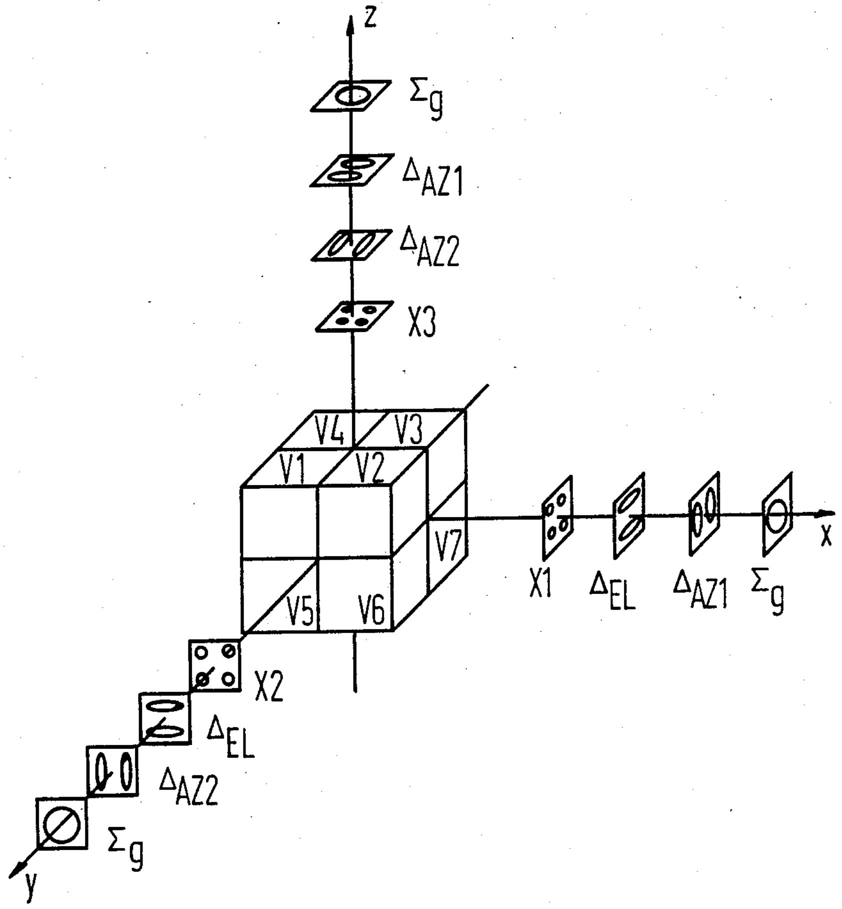
FIG. 4 illustrates the various sum-difference radiation patterns relative to the antenna axes and octants of a group antenna of the invention.

FIG. 4 illustrates how the radiation patterns associated with all of the outputs of the sum difference circuits of FIGS. 2 and 3 are allocated to the antenna axes x, y and z and to the octants V1 through V8. The antenna axis x is defined by the intersecting line of the planes E1 and E2; the antenna axis y is defined by the intersecting line between the planes E1 and E3; and the antenna axis z is defined by the intersecting line between the planes E2 and E3. The $\epsilon$ represents a sum pattern having a single lobe. $\Delta$ represents different patterns having a double lobe and minimum valley and x represents diagonal difference patterns having quadruple lobes and minimum crossings. $\epsilon_g$ thus denotes the overall sum pattern, $\Delta_{E1}$ refers to the elevation difference pattern and $\Delta_{Az1}$ and $\Delta_{Az2}$ refer to the two azimuth difference patterns. $X_1$, $X_2$, and $X_3$ refer to diagonal difference patterns having the following form:

$$X1 = SV1 + SV2 + SV7 + SV8 - (SV3 + SV4 + SV5 + SV6)$$

$$X2 = Sv1 + Sv4 + SV6 + Sv7 - (SV2 + SV3 + SV5 + Sv8)$$

$$X3 = SV1 + SV5 + SV3 + Sv7 - (SV2 + SV4 + SV6 + SV8)$$

Figure 5:
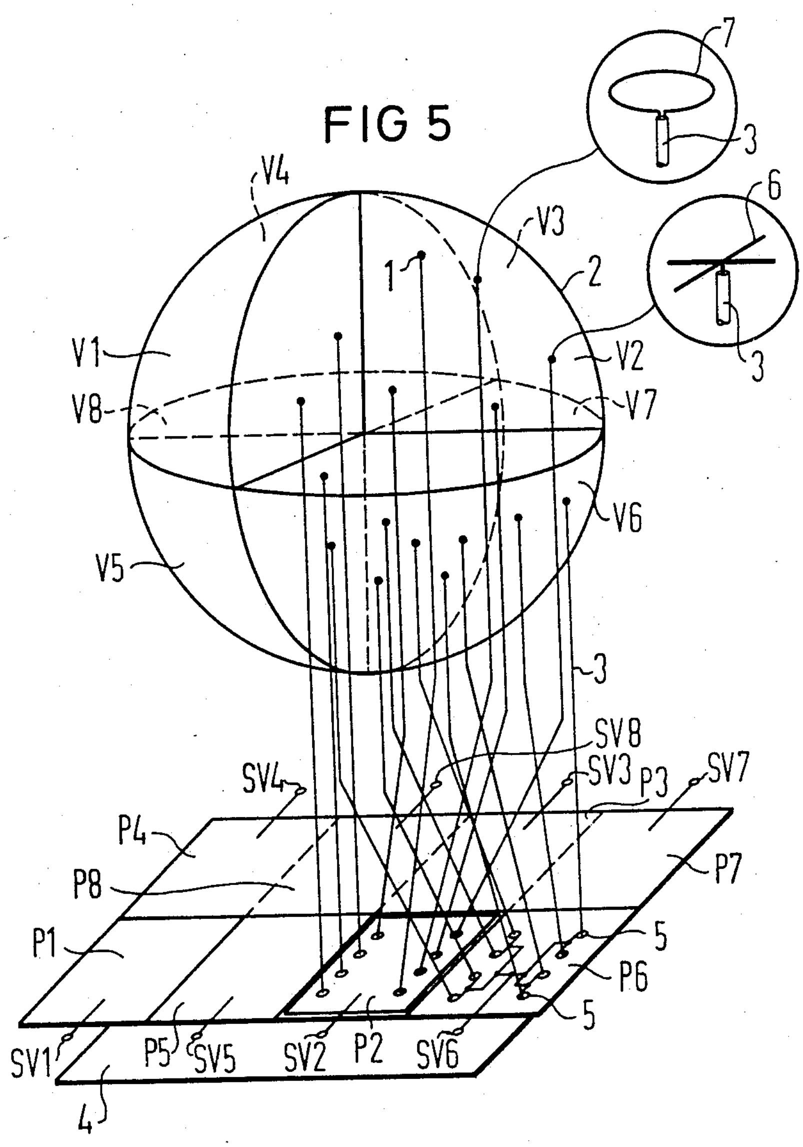
FIG. 5 illustrates a spherical group antenna with line and distributor systems for generating the desired sum and difference signals.

FIG. 5 comprises a perspective view of a spherical imaginary body 2 within whose volume individual radiators 1 having omni-directional characteristics are distributed. The distribution of the individual radiators 1 in the volume is such that an optimally uniform projected arrangement occurs for all directions. The individual radiators 1 are designed for horizontal polarization and can be, for example, formed by horizontally disposed conductor rings 7 or by horizontally disposed crossed dipoles in the manner of turnstile antennas. Feedlines 3 extend essentially vertically to the individual radiators from below. The individual radiators 1 are integrated in the imaginary sphere 2 and are divided into eight octants V1 through V8 according to the cube combination illustrated in FIG. 1. Octant signals SV1 through SV8 are associated with the octants V1 through V8. As a consequence of the horizontal polarization of the individual radiators 1 of the group antenna, the three dimensional divisions of the feedlines 3 for the individual octants V1 through V8 having a horizontal component in the feed lines does not occur until outside of the beam path of the group antenna, in other words, below the emitting "sphere" (2). The feedlines 3, for example, coax lines, leading from the individual radiators 1 from above provide outputs, for example, at the phase shifters 5 for the respective individual radiator 1 which can be accommodated on distributor plates P1 through P8 for the associated octants V1 through V8. The outputs of the octant distributor plates P1 through P8 then supply the input signals SV1 through SV8 for the sum difference circuit 4 which can be formed according to the exemplary embodiments illustrated in FIGS. 2 and 3. The sum-difference circuit 4 can be mounted below the octant distributor plates P1 through P8 and can be mounted on a plate which is parallel to the octant distributor plates. As previously described, the realization of the sum-difference circuit 4 and, in an expedient manner, of the distributor plates P1 through P8 are formed in card modules structure and it should be noted that the production of all connecting lines in the sum-difference circuit 4 is not possible in a single plane. A small part of the circuit 4 must be executed in a second plate so as to bridge one or more line crossings.

Figure 6:
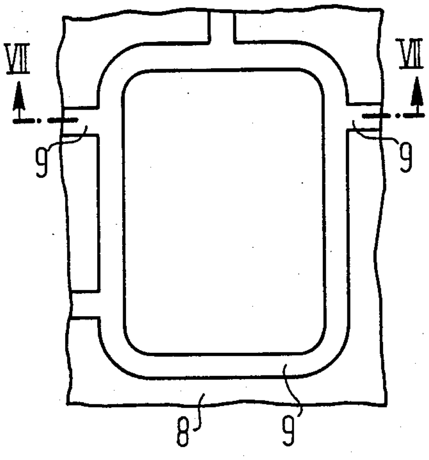
FIG. 6 is a plan view of a small portion of a first coax line embodiment of a sum difference circuit in card module structure for the group antenna of FIG. 5.

FIGS. 6 through 9 illustrate a small portion of a first exemplary coax line system embodiment of a sum-difference circuit 4 in card module structure and illustrates one of the eleven ring-hybrids. FIG. 6 illustrates the ground plane of an outside conductor plate 8 which may be the base plate composed of metal formed with depressions 9 which are milled out for receiving an inside conductor.

Figure 7:
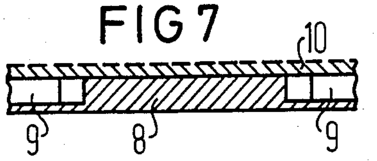
FIG. 7 is a cross-sectional view taken on line VII—VII of FIG. 6.
Figure 9:
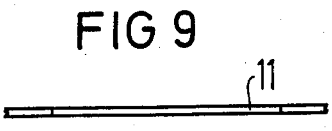
FIG. 9 is a top elevation view of the inside circuit board of FIG. 8.
Figure 8:
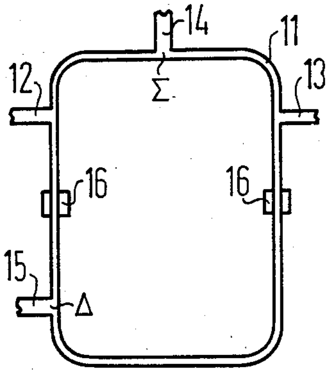
FIG. 8 illustrates a constructed inside printed circuit board.

FIG. 7 is a cross-sectional view through the planar outside conductor plate 8 through line VII—VII of FIG. 6 where a planar metallic cover plate 10 covers the outside conductor plate 8 so that the depressions 9 are effective together with the cover plate 10 to form a closed outside conductor of a coax line system. The ground plan of associated inside conductor plate 11 is shown in FIG. 8 and the corresponding elevation is illustrated in FIG. 9. Two feed locations are indicated by 12 and 13 in FIG. 8. Two additional feed locations 14 and 15 are provided for taking the sum signal or, respectively, the difference signal. Dielectric supports 16 hold the inside conductor within the opening 11.

Figure 11:
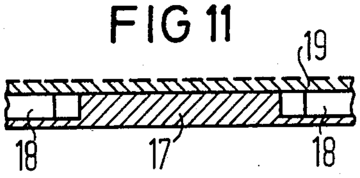
FIG. 11 is a sectional view taken on line XI—XI from FIG. 10.
Figure 10:
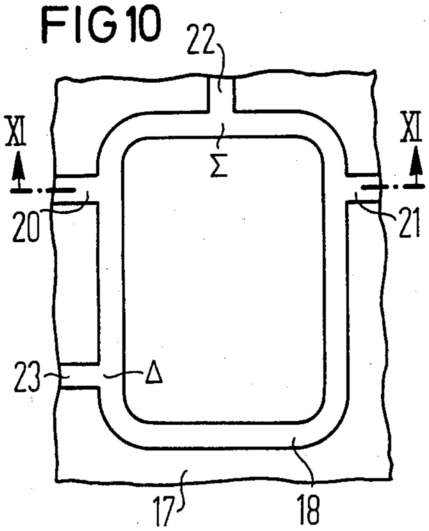
FIG. 10 illustrates a ground plane of a small portion of a second embodiment formed with waveguides of a sum-difference circuit in card module structure for the group antenna of FIG. 5.

FIGS. 10 and 11 illustrate a small portion of a second exemplary embodiment formed of waveguides of a sum-difference circuit 4 in card module structure and particularly one of the eleven ring hybrids. FIG. 10 illustrates the ground plan view of a planar base plate 17 composed of metal in which depressions 18 are milled therein and has a constant quadratic or rectangular cross-section which are provided according to the desired course lines, in other words, the ring hybrid in this case. FIG. 11 comprises a cross-section through the planar base plate along the plane XI—XI whereby a planar cover plate 19 for covering the base plate 17 is a mechanically and electrically connected to the base plate 17 and is also formed of metal and the openings 18 form a waveguide system. Two feed locations are indicated by 20 and 21. Two additional feed locations 22 and 23 are provided for removing the sum and the difference signals.

Figure 13:
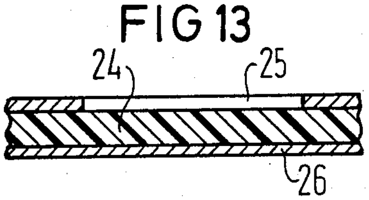
FIG. 13 is a sectional view taken on line XIII—XIII from FIG. 12.
Figure 12:
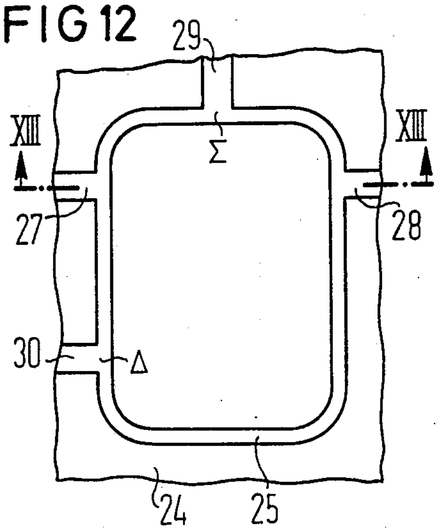
FIG. 12 is a plan view of the ground portion of a small portion of a third exemplary stripline embodiment of a sumdifference circuit in card module structure for the group antenna of FIG. 5.

FIGS. 12 and 13 illustrate a small portion of a third embodiment of a strip line system of a sum difference circuit 4 and card module structure and illustrates one of the eleven ring hybrids. FIG. 12 shows the ground plane of a planar base plate 24 composed of dielectric material on which a stripline 25 corresponding to the desired line course in other words the ring hybrid is applied. FIG. 13 illustrates a cross-section through the planar plate 24 along the plane XIII—XIII whereby a through conductor layer 26 is also visible under the base plate 24 which is composed of insulating material. Two feed locations of the ring hybrid are indicated by 27 and 28. Two additional feed locations 29 and 30 are provided for taking the sum and the difference signals.

Although the invention has been described with respect to preferred embodiments, it is not to be so limited as changes and modifications can be made which are within the full intended scope of the invention as defined by the appended claims.

I claim as my invention:

1. A group antenna comprising a plurality of line-fed individual radiators having omni-directional characteristics which are mounted within the volume of an imaginary body, particularly a sphere, and which are arranged symmetrically with respect to a horizontal plane E1 and two vertical plane E2 and E3 which intersect perpendicularly to each other, said group antenna being electronically phase-controlled so as to sweep the beam in all directions for radar scanning, characterized in that the individual radiators (1) are divided into eight octant sub-volumes (V1 through V8) which are respectively limited relative to one another by said three planes E1, E2, and E3 and which are separatly fed signals for the formation of an overall sum signal ($\epsilon_g$), as well as an elevation difference signal ($\Delta_{E1}$), and two azimuth difference signals ($\Delta_{AZ1}$, $\Delta_{AZ2}$), the signals SV1 through SV8 of the eight octants are combined in a circuit so as to obtain the overall sum signal, the elevation difference signal and the two azimuth difference signals and said circuit comprising, a total of eleven elements such as ring hybrids or magic T's operating as follows:

(1) forming 4 first sum and 4 first difference signals from 4 hybrid rings representative of the sum and difference signals of octants adjacent one another;

(2) forming 2 second sum signals and 4 second difference signals with 4 additional hybrid rings from the aforementioned 4 first sum signals and 4 first difference signals such that the sum and difference signals derived form adjacent octant pairs are combined;

(3) combining the 2 second sum signals and 4 second difference signals in 3 further additional hybrid rings to form the desired overall sum signal, elevation difference signal and 2 azimuth difference signals.

2. A group antenna according to claim 1, characterized in that the outputs of the elements forming the sum and difference signals which are not used for further combination are provided with terminating impedences.

3. A group antenna according to claim 1 or claim 2, characterized in that, for special evaluation methods, combination signals which can be referred to as diagonal difference signals which yield radiation minimums on the principal axes (x, y, z) established by the intersections of the three planes (E1, E2, E3) and which are not required in and of themselves for the formation of the four desired sum and difference signals ($\epsilon_g$, $\Delta$E1, $\Delta_{Az1}$, $\Delta_{Az2}$) also occur at some of the outputs of said elements forming the sum signals and the difference signals which are provided with a terminating impedance.

4. A group antenna according to claims 1 or 2 characterized in that the three-dimensional distribution of the individual radiators (1) filling up the volume of the imaginary body (2) is such that an optimally identical projected arrangement occurs for all directions.

5. A group antenna according to claim 1 characterized in that the individual radiators (1) are horizontally polarized and the feed lines (3) to the individual radiators extend vertically.

6. A group antenna according to claim 5, characterized in that the individual radiators (1) are formed by horizontally disposed conductor rings (7).

7. A group antenna according to claim 5, characterized in that the individual radiators are formed by horizontally disposed crossed dipoles (6) in the fashion of turnstile antennas.

8. A group antenna according to claims 5 or 6 or 7, characterized in that said sum-difference circuit (4) is a card module structure which comprises one circuit level with a few bridges or comprises two circuit levels.

9. A group antenna according to claim 8, characterized in that the sum-difference circuit (4) is formed in stripline technology for the transmission of low power, for example, using exclusive reception mode or using active individual radiators.

10. A group antenna according to claim 5, characterized in that for the transmission of higher power in the sum channel, the sum-difference circuit (4) is formed as a coax line system in its entirety or only for the sum channel paths, said coax line system comprising, a first outside conductor which is formed by a metal planar base plate (8) in which depressions (9) having a constant quadratic or rectangular cross-section are provided according to the desired course of line paths and which is covered by a metal planar cover plate (10) which is mechanically and electrically connected to said base plate, and which includes an inside conductor (11) mounted in said depressions of said base plate and supported therein by means of dielectric supports (16), said inside conductor having a rectangular cross-section with a constant height and a width depending upon the characteristic impedance required.

11. A group antenna according to claim 5, characterized in that for the transmission of higher powers in the sum channel, the sum-difference circuit (4) is formed as a waveguide system in entirety or for only the sum channel paths, said waveguide system comprising a metal base plate (17) in which depressions (18) having a constant quadratic or rectangular cross-section are formed according to the respectively desired course of the line paths, and a planar metal cover plate (19) covers said base plate and is mechanically and; electrically connected to said base plate.

12. A group antenna according to claims 10 or 11, characterized in that said depressions (9, 18) are milled with a computer-controlled milling machine.

13. A group antenna according to claims 10 or 11, characterized in that the sum-difference circuit (4) formed in a card module structure is arranged below the imaginary body (2) which is provided with individual radiators (1) and outside of the beam path; and that additional distributor circuits (P1 through P8) which are respectively allocated to an octant (V1 through V8) are provided below said imaginary body above said cricuit outside of said beam path, and said distributor circuits being formed as a card module structure and the individual radiator feed lines (3) extend vertical from above the respectively associated octant which feed thereinto; and the outputs of the octant distributor circuits supply the input signals (SV1 through SV8) for the sum-difference circuit (4).

14. A group antenna according to claim 13, characterized in that the phase shifters (5) for the individual radiators (1) of an octant (V1 through V8) are mounted on the distributor circuit (SV1 through SV8) which is associated with the particular octant; and the feed lines (3) of the individual radiators (1) extend vertically from said phase shifters.

15. A group antenna comprising a plurality of line-fed individual radiators having omni-directional characteristics which are mounted within the volume of an imaginary body, particularly a sphere, and which are arranged symmetrically with respect to a horizontal plane E1 and two vertical planes E2 and E3 which intersect perpendicularly to each other, said group antenna being electronically phase-controlled so as to sweep the beam in all directions for radar scanning, characterized in that the individual radiators (1) are divided into eight octant sub-volumes (V1 through V8) which are respectively limited relative to one another by said three planes E1, E2 and E3 and which are separately fed signals for the formation of an overall sum signal ($\epsilon_g$) as well as an elevation difference signal ($\Delta_{E1}$), and two azimuth difference signals ($\Delta_{Az1}$,$\Delta_{Az2}$) , the signals SV1 through SV8 of the eight octants are combined in a circuit so as to obtain the overall sum signal, the elevation difference signal and the two azimuth difference signals and said circuit comprising, a total of eleven elements such as ring hybrids of magic T's operating as follows:

(1) forming 4 first sum and 4 first difference signals from 4 hybrid rings representative of the sum and difference signals of octants adjacent one another;

(2) forming 4 second sum signals and two second difference signals with 4 additional hybrid rings from the aforementioned 4 first sum signals and 4 first difference signals such that the sum and difference signals derived from adjacent octant pairs are combined;

(3) combining the 4 second sum signals and 2 second difference signals in 3 further additional hybrid rings to form the desired overall sum signal, elevation difference signal and 2 azimuth difference signals.

* * * * *